R. V. BARRY.
GRAIN SHOCKING ATTACHMENT FOR HARVESTING MACHINES.
APPLICATION FILED JAN. 29, 1914.
1,149,492.
Patented Aug. 10, 1915.
4 SHEETS—SHEET 2.
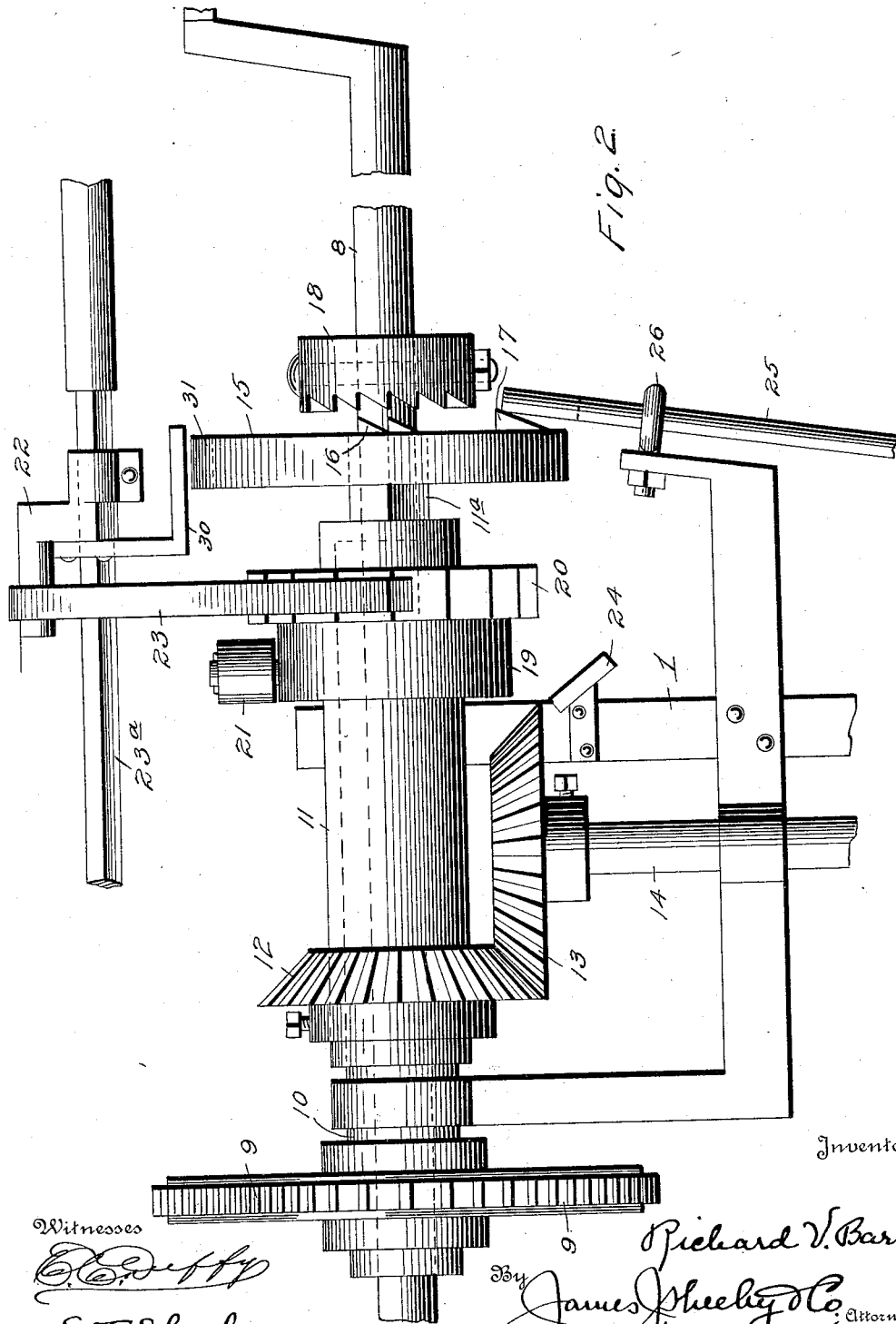

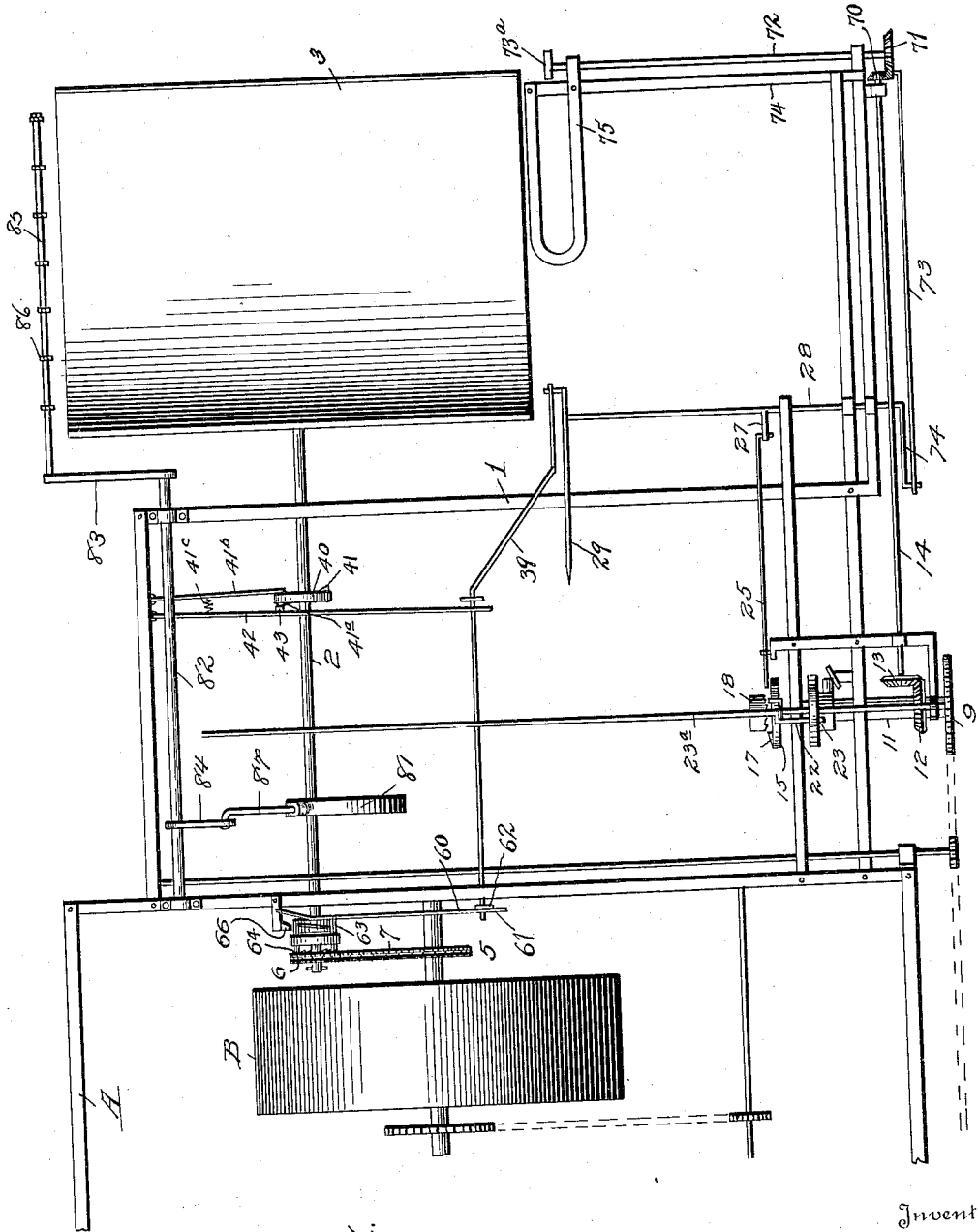

R. V. BARRY.
GRAIN SHOCKING ATTACHMENT FOR HARVESTING MACHINES.
APPLICATION FILED JAN. 29, 1914.
1,149,492. Patented Aug. 10, 1915.
4 SHEETS—SHEET 3.
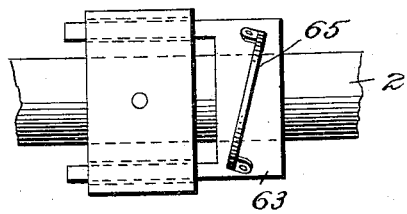
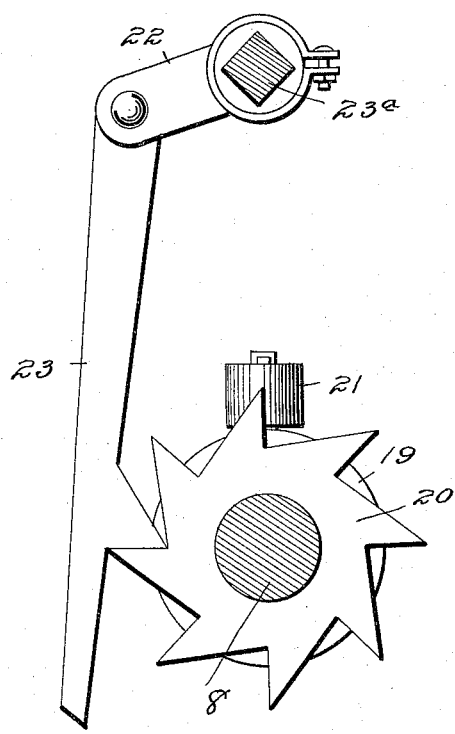
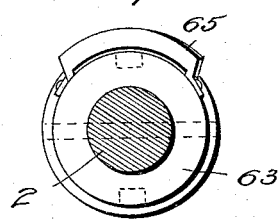
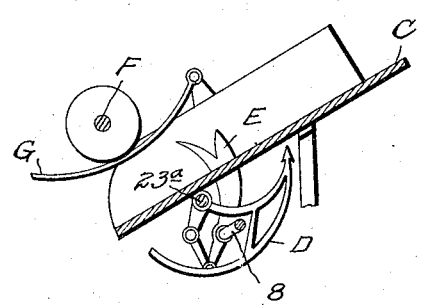
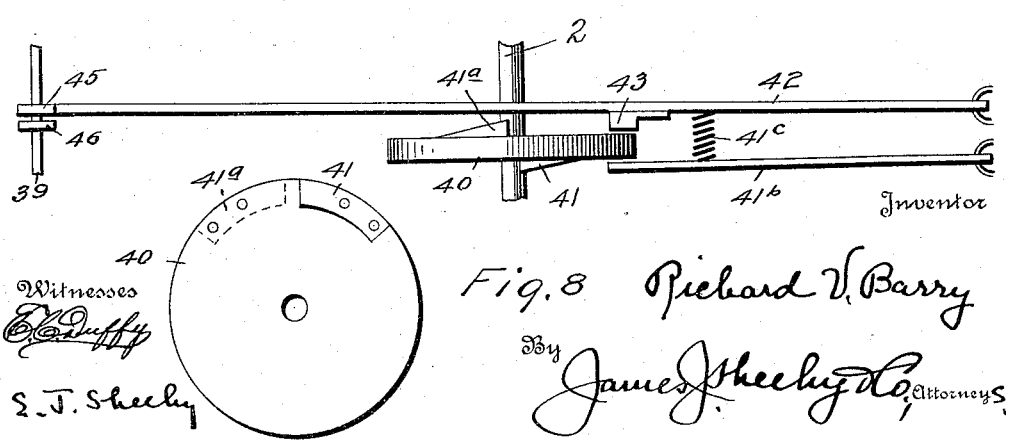

R. V. BARRY.
GRAIN SHOCKING ATTACHMENT FOR HARVESTING MACHINES.
APPLICATION FILED JAN. 29, 1914.
1,149,492.
Patented Aug. 10, 1915.
4 SHEETS—SHEET 4.
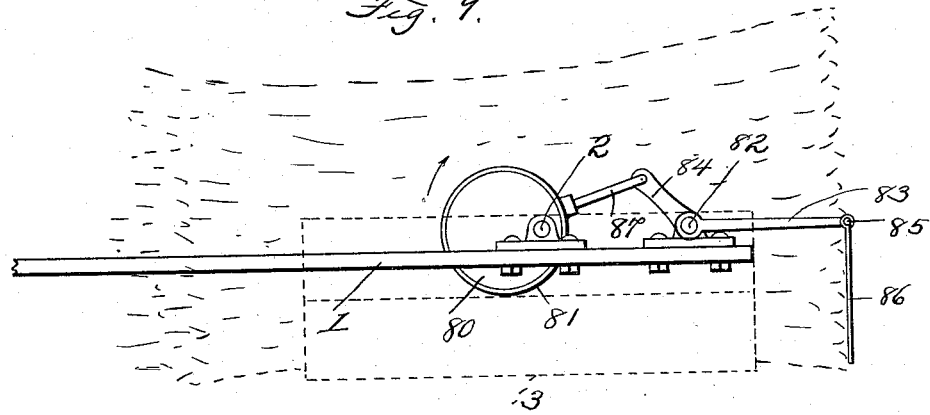
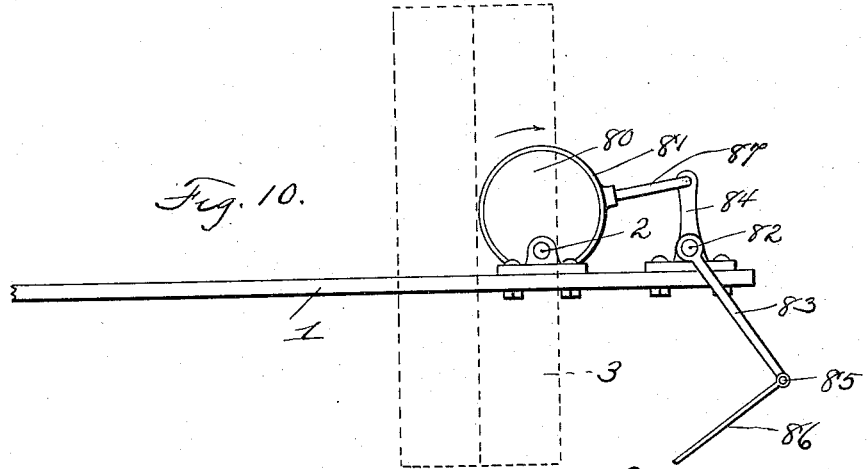
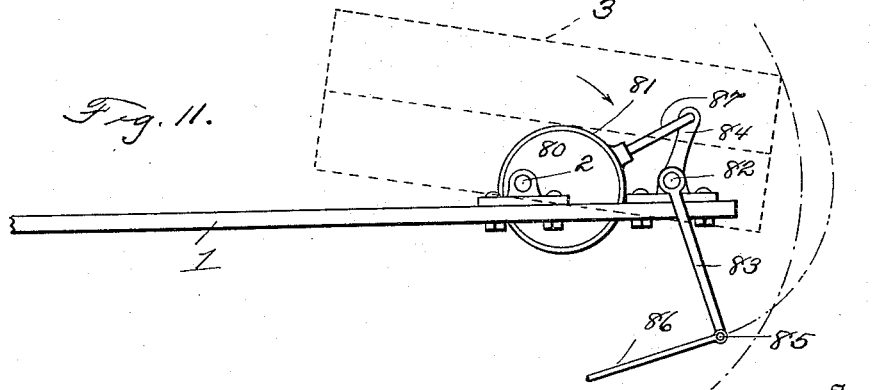

UNITED STATES PATENT OFFICE.

RICHARD V. BARRY, OF OTTUMWA, IOWA.

GRAIN-SHOCKING ATTACHMENT FOR HARVESTING-MACHINES.

1,149,492.  Specification of Letters Patent.  Patented Aug. 10, 1915.

Application filed January 29, 1914. Serial No. 815,220.

*To all whom it may concern:*

Be it known that I, RICHARD V. BARRY, citizen of the United States, residing at Ottumwa, in the county of Wapello and State of Iowa, have invented new and useful Improvements in Grain-Shocking Attachments for Harvesting-Machines, of which the following is a specification.

My present invention pertains to grain shocking attachments for harvesting machines; and it contemplates the provision of a simple, compact and reliable construction, adapted to receive bundles of grain from the bundle-binding mechanism of a grain harvester, and bind the bundles into a shock, and stand the shock on end on the ground at the side of the machine.

The invention in all of its details will be fully understood from the following description and claims when the same are read in connection with the drawings, accompanying and forming part of this specification, in which:

Figure 1 is a top plan view illustrating the application of the attachment constituting the preferred embodiment of my invention as applied to a conventional harvesting machine. Fig. 2 is an enlarged detail plan view of the mechanism for establishing and disconnecting the coupling of the packer shaft of the organized bundle binding mechanism with the shock binding mechanism. Fig. 3 is a detail view illustrative of the mechanism for transmitting motion from the needle shaft 23ª of the bundle binding mechanism to the sleeve 11. Fig. 4 is a top plan view of the clutch member that is adapted to rotate with the cradle shaft 2. Fig. 5 is a section taken transversely through said shaft and showing said clutch member in end elevation. Fig. 6 is a fragmentary view illustrating the organized bundle binding mechanism of the harvesting machine. Fig. 7 is an enlarged detail plan illustrative of the means for holding the cradle shaft 2 against rotation. Fig. 8 is a view showing in side elevation the disk comprised in said means. Figs. 9, 10 and 11 are detail views showing in side elevation the cradle and the butt fingers in the different positions they assume.

Similar letters and numerals of reference designate corresponding parts in all of the views of the drawings.

The main frame A of the harvester is supported by a ground wheel B, in the conventional manner, and is equipped with the usual appurtenances of a grain harvester such as the deck-board C, the needle D, the packer E, the knotter F and the breast-plate G. These parts constitute an organized bundle-binding mechanism, and I would here have it understood that the bundle-binding mechanism forms no part of my present invention, and that, therefore, it may be of the construction illustrated or of any other construction compatible with my grain-shocking attachment invention without involving departure from the scope of the same as claimed.

In furtherance of my present invention, a sub-frame 1 is fixed with respect to the harvester frame A, and in the said frame 1 is journaled the shaft 2 of a cradle 3 that is adapted to receive bundles of grain and hold the same while they are being bound into a shock, and is also adapted to deposit the shock on end on the ground at the side of the path of the machine during the travel thereof.

Fixed with respect to the wheel B is a sprocket gear 5 having twelve teeth, and loosely mounted on the cradle shaft 2 is a sprocket gear 6; the said gear 6 being provided with eight teeth, and being connected with the gear 5 through the medium of a sprocket belt 7.

8 is the shaft of the packers comprised in the bundle-binding mechanism of the harvesting machine. Fixed with respect to the shaft 8 is a sprocket gear 9 through the medium of which the packer shaft is rotated in the ordinary well-known manner. Also fixed on the shaft 8 is a sleeve 10 that extends through the hub of the gear 9. On said sleeve 10 is loosely mounted a sleeve 11, the inner end portion 11ª of which is angular in cross-section. Fastened by a set screw or other suitable means to the sleeve 11 is a beveled gear 12. Intermeshed with said gear 12 is a beveled gear 13 on a shaft 14, designed to operate the binding and knotting mechanism of the shocker. It will here be understood that the packer shaft is rotated continuously during the operation of the machine. The sleeve 11, however, is rotated only when it is set in motion by the gear 15. This gear is designed to slide on and turn with the angular end portion of the sleeve 11, and is provided at one side with clutch teeth 16 and a beveled projection 17. When the gear 15 is moved inwardly, its teeth 16 are engaged with the complementary teeth of a clutch member 18 that is fixed to the packer shaft. The gear 15 is moved inwardly through the medium of the mechanism best shown in Fig. 2. This mechanism comprises a sleeve 19 movable endwise on and rotatable about the sleeve 11, a ratchet disk 20 fixed on said sleeve 19, a radial projection 21 (preferably in the form of an anti-friction roller as shown), carried by the sleeve 19, a crank arm 22 fixed on the shaft 23$^a$ of the bundle needle D, a pawl 23 pivoted to the arm 22 and arranged to engage the teeth of the ratchet disk 20, which teeth are preferably eight in number, and an inclined cam 24 fixed to a portion of the frame 1 and adapted at a certain time to engage the projection 21 and thereby move the gear 15 laterally inward and into engagement with the clutch member 18 that is fast on the continuously rotating shaft 8. The operation of this portion of my novel mechanism is as follows: As each bundle of grain is bound, the pawl 23 coöperating with the teeth of the ratchet disk 20 on the sleeve 19 turns the said sleeve through a part of a revolution. This continues until the projection 21 engages the inclined cam 24, when the gear 15 is engaged with the cam member 18, whereupon the sleeve 11 will be caused to rotate with the shaft 8, and the shaft 14 will also be caused to rotate, and through the medium of the latter the binding and shocking mechanism of the shocker will be actuated, as hereinafter set forth. Three revolutions of the packer shaft 8 and gear 15 are required to bind a shock collected in the cradle 3, and then a rod 25, guided at 26 on the frame 1 is pushed into the position shown by full lines in Fig. 2, so as to engage the beveled projection 17 at the proper time, and thereby move the gear 15 out of engagement with the clutch member 18 and stop the binding and knotting mechanism of the shocker. The rod 25 is connected to a crank arm 27 on the needle shaft 28 of the shocking mechanism; the shocking needle being numbered 29. On the upward movement of the said needle 29 to bind, the rod 25 is drawn rearwardly to the position shown by dotted lines in Fig. 2. Then on the downward movement of the needle 29 the rod 25 is moved to the position shown by full lines in Fig. 2, with the result that when the projection 17 engages the rod 25, the gear 15 will be disengaged from the clutch member 18, and the operation of the binding and knotting mechanism of the shocker will be suspended, this in order to permit of the collection of the requisite number of bundles to form a shock in the cradle 3.

30, Fig. 2, is a right-angle finger connected with the arm 22 on the shaft 23$^a$ and designed to engage a peripheral projection 31 on the gear 15. When the first bundle that is to be comprised in a shock is being bound, the finger 30 engages the peripheral projection 31, and thereby moves the gear 15 through a part of a revolution, and in that way moves the projection 17 past the rod 25.

Fixed to and movable with the needle 29 of the binding and knotting mechanism of the shocker is a rod 39. This rod serves first—to unlock the cradle shaft 2, and then to bring about the rotation of the same. The cradle shaft 2 and the cradle 3 are held against rotation while the bundles to form a shock are being deposited in the cradle through the medium of a disk 40 fixed on the shaft 2 and having beveled lugs 41, 41$^a$ at its opposite sides, a pivoted latch 41$^b$, and a lever 42 having a lug 43; said lever and latch being connected by an interposed retractile spring 41$^c$. The lug 43 of lever 42 engages the lug 41$^a$ of disk 40 and holds the cradle 3 in horizontal position while the shock is being gathered in the cradle. The latch 41$^b$ prevents backward movement of cradle 3. It assumes a position back of the lug 41 at each revolution of the cradle shaft and cradle. The lever 42 is provided at one end with an eye 45 adapted for the engagement of an abutment 46 on the rod 39, and hence it will be manifest that on the upward stroke of the needle 29 the shaft 2 and cradle 3 will be rendered free to be turned. Immediately after the unlocking of the shaft 2 and cradle 3, as stated, the shaft 2 is connected with the sprocket gear 6, whereupon the shaft and cradle will be rotated to discharge the bound shock and stand the same on end on the ground. The said connection is effected through the medium of a lever 60, fulcrumed at one end and having an eye 61 at its opposite end opposed to an abutment 62 on the rod 39, and a clutch member 63 opposed to clutch teeth 64 on the sprocket gear 6, and mounted to slide on and turn with the cradle shaft 2. The lever 60 has a portion that loosely receives the cradle shaft 2, and is arranged against the outer side of the clutch member 63, and hence it will be seen that movement of the lever 60 by the rod 39 will be attended by movement of the clutch member 63 into engagement with the clutch teeth 64. On the subsequent rotation of the clutch member 63 with the cradle shaft 2 and the cradle 3, the inclined portion 65 of the clutch member 63 will, by coöperating with a stationary anti-friction roller 66 draw the clutch member 63 out of engagement with the clutch teeth 64, this at the completion of the revolution of the shaft 2 and cradle 3, at which time the latch 41<sup>b</sup> will assume a position back of lug 41 on the disk 40 to lock said shaft and cradle.

Fixed on the outer end of the shaft 14 is a beveled gear 70. This gear 70 is intermeshed with a beveled gear 71 on a shaft 72, and the said gear 71 is connected through a pitman 73 with a crank 74 on the needle shaft 28 to actuate the latter. In addition to the gear 71, the shaft 72 is equipped with a knotter gear 73<sup>a</sup> which *per se* is of the ordinary construction. It will also be observed that supported on a frame bar 74 and arranged opposite the knotter gear 73<sup>a</sup> is a conventional breast plate through which the needle is designed to project.

The means for transmitting motion to the sprocket gear 9 with a view to rotating the packer shaft of the organized bundle-binding mechanism forms no part of my invention, and I have therefore deemed it unnecessary to illustrate said means.

As will be gathered from the foregoing, when a shock which may comprise any suitable number of bundles is gathered in the cradle 3, the shock-binding mechanism is automatically put into operation; the shock being bound around the top with a view to assuring the shock being stood on its base when it is set off by the cradle 3. It will also be gathered that the cradle 3 is automatically unlocked and caused to rotate to set the shock on its base; the said cradle revolving over the discharged shock and back into place to receive another shock.

With a view to contributing to the proper placing of the shocks on the ground during the forward travel of the machine, I provide the mechanism shown in Figs. 1, 9, 10 and 11. The said mechanism comprises an eccentric 80 fixed on the cradle shaft 2, an eccentric-strap 81 mounted on said eccentric, a transverse shaft 82 journaled in bearings on the forward portion of the sub-frame 1 and having an angularly-disposed arm 83 at its outer end and also having a crank 84, a bar 85 reaching laterally outward from the arm 83 and carrying a plurality of fingers 86 adapted to be moved to and from a position in front of and at right angles to the cradle 3, when the latter is in its receptive position, and a rod 87 interposed between and connecting the eccentric strap 81 and the crank 84. The movements of the said parts are so timed that the fingers 86 rest in an upright position at the butts of the bundles while the shock is being formed, and incidental to the delivery of the shock the rotation of the eccentric 80 through the mechanism described will lower the fingers to a horizontal position, thereby enabling the fingers to support the shock and preclude the same being thrown forward by the momentum of the machine.

Having described my invention, what I claim and desire to secure by Letters-Patent, is:

1. The combination of the packer shaft and the needle shaft of the bundle-binding mechanism of a harvesting machine, the ground wheel of the machine, a sub-frame carried by the frame of the machine, a shaft journaled in said sub-frame, a cradle carried by said shaft; a clutch member loose on said shaft and connected with said ground wheel, a clutch member mounted to turn with said shaft and move endwise into and out of engagement with the first-named clutch member, a lever for moving the second-named clutch member into engagement with the first-named clutch member, means for disengaging said second-named clutch member on rotation thereof, a disk fixed on the cradle shaft and provided with beveled lugs, means for coöperating with one of said lugs to prevent backward movement of the cradle shaft, a lever constructed and arranged to normally coöperate with the other lug and prevent forward movement of the cradle shaft, an organized shock-binding mechanism carried by the sub-frame and comprising a shaft carrying a knotter, and a shaft equipped with cranks and a needle, a rod connected with said needle and having abutments to move said levers, means connecting the knotter shaft with the other crank of said needle shaft, rotary means loose on the packer shaft of the bundle binding means, means on the needle shaft of the bundle-binding mechanism for imparting a step by step motion to said rotary means, a driving connection intermediate said rotary means and the knotter shaft of the shock-binding mechanism, means for clutching said rotary means when rotated step by step to the packer shaft of the bundle binding mechanism, and means actuable by the shock-binding needle for disconnecting said rotary means from said packer shaft.

2. The combination of the packer shaft and the needle shaft of the bundle-binding mechanism of a harvesting machine, the ground wheel of the machine, a sub-frame carried by the frame of the machine, a shaft journaled in said sub-frame, a cradle carried by said shaft; an organized shock-binding mechanism carried by the sub-frame and comprising a shaft equipped with a knotter, means actuable by said needle shaft of the bundle-binding mechanism for connecting the cradle shaft with the ground wheel, means for disconnecting said cradle shaft from the ground wheel, means for holding the cradle shaft against rotation, means actuable by said needle shaft for unlocking or releasing the cradle shaft, rotary means loose on the packer shaft of the bundle-binding means, driving connections between said rotary means and the knotter shaft and needle shaft of the shock-binding means, means on the needle shaft of the bundle-binding mechanism for rotating said rotary means step by step, means for clutching said rotary means when so rotated to the packer shaft of the bundle-binding means, a rod connected with the needle shaft of the shock-binding mechanism, and means controlled by said rod for disconnecting the said rotary means from the packer shaft.

3. The combination of a frame, a cradle shaft journaled therein, a disk fixed on said shaft and having beveled lugs at its opposite sides, a latch pivoted to the frame and arranged to engage one lug to hold the cradle shaft against backward movement, a lever pivoted to the frame and arranged to engage the other lug to hold the cradle shaft against forward movement, a retractile spring connecting said latch and lever, and means for moving said lever to unlock the cradle shaft.

4. The combination of a frame, a cradle shaft journaled therein, a clutch member mounted to turn with and move endwise on said shaft, a cam on said clutch member, a tappet carried by said frame and arranged to engage said cam on rotation of the clutch member to move said member in one direction, and means for moving the clutch member in the opposite direction.

5. The combination of the needle shaft and the packer shaft of a bundle-binding mechanism, a clutch member fixed on said packer shaft, a shock-binding mechanism, a sleeve loose on the packer shaft and connected with the shock-binding mechanism and having an end portion of angular form in cross-section, a gear mounted on said angular portion of the sleeve and having a peripheral projection and clutch teeth, the latter to engage the teeth of the clutch member fast on the packer shaft, and also having a beveled lug at one side, an endwise movable rod actuable by the shock-binding mechanism and constructed and arranged in one position to engage said lug and disengage said clutch member from the clutch member that is fast on the shaft, a sleeve loose on the first-named sleeve and opposed to said gear and having ratchet teeth and also having a projection, a cam on the frame arranged to engage said projection and move the second-named sleeve endwise to put the gear in engagement with the clutch member, a crank on the needle shaft of the bundle-binding means, a pawl on said crank to engage said ratchet teeth, and a finger on the crank to engage the peripheral projection of the gear.

6. The combination of the organized bundle-binding mechanism of a grain-harvesting machine, an organized shock-binding mechanism carried by the machine, a rotary cradle normally held against rotation, means for positively rotating the cradle, means actuable by the shock-binding mechanism for unlocking the cradle, means actuable by the shock-binding mechanism for connecting the cradle with the said means for rotating the same, means for disconnecting the cradle incidental to the rotation thereof from said rotating means, means controlled by the bundle-binding mechanism for actuating the shock-binding mechanism at intervals, and means actuable by rotation of the cradle for offering an abutment to the butt ends of the bundles and supporting the shock, said means comprising an eccentric on the cradle shaft, a shaft supported independently of the cradle and having a crank, an eccentric strap mounted on the eccentric and connected with said crank, an arm at the outer end of said shaft, and means carried by said arm and constructed and arranged to be opposed to the butt ends of the bundles, substantially as specified.

7. The combination of a rotary shock-receiving cradle having a shaft, and means actuable by rotation of the cradle for offering an abutment to the butt ends of the bundles and supporting the shock precedent to the delivery of the same to the ground, the said means comprising an eccentric on the cradle shaft, a shaft supported independently of the cradle and having a crank, an eccentric strap mounted on the eccentric and connected with said crank, an arm at the outer end of said shaft, and means carried by said arm and constructed and arranged to be opposed to the butt ends of bundles in the cradle.

8. The combination of a rotary shock-receiving cradle having a shaft and an eccentric thereon, a shaft supported independently of the cradle and in front of the cradle shaft and at one side of the path of movement of the cradle and having a crank, an eccentric strap on the eccentric and connected with said crank, an arm at the outer end of said shaft, a bar reaching laterally outward from said arm, and a plurality of fingers carried by and extending at right angles to said bar.

9. The combination of a frame, a cradle shaft journaled therein, a clutch member mounted on said cradle shaft to turn with and move endwise thereon, a cam on said clutch member, a tappet carried by said frame and arranged to engage said cam on rotation of the clutch member to move said member in one direction, a lever arranged when moved to move the clutch member in the opposite direction, a rotary clutch member arranged to be engaged by the first-named clutch member when the latter is moved in the last-named direction, means for rotating the second-named clutch member, an endwise movable rod having an abutment arranged on movement of said rod to move said lever, and an organized shock-binding mechanism comprising a needle connected with said rod.

In testimony whereof I have hereunto set my hand in presence of two subscribing witnesses.

RICHARD V. BARRY.

Witnesses:
O. L. SHADFORD,
W. D. ELLIOTT.

Copies of this patent may be obtained for five cents each, by addressing the "Commissioner of Patents, Washington, D. C."